United States Patent
Appel et al.

(10) Patent No.: US 6,897,652 B2
(45) Date of Patent: May 24, 2005

(54) NMR FLOW MEASUREMENT WHILE DRILLING

(75) Inventors: Matthias Appel, Norwich (GB); Martin Alfred Kraaijveld, Lowestoft (GB)

(73) Assignee: Shell Oil Company, Houston, TX (US)

( * ) Notice: Subject to any disclaimer, the term of this patent is extended or adjusted under 35 U.S.C. 154(b) by 8 days.

(21) Appl. No.: 10/465,760

(22) Filed: Jun. 19, 2003

(65) Prior Publication Data

US 2004/0257074 A1 Dec. 23, 2004

(51) Int. Cl.[7] .................................................. G01V 3/00
(52) U.S. Cl. ........................................ 324/303; 324/300
(58) Field of Search ............................... 324/303, 300, 324/306, 307, 309, 312, 314

(56) References Cited

U.S. PATENT DOCUMENTS

| | | | | |
|---|---|---|---|---|
| 4,728,892 A | * | 3/1988 | Vinegar et al. | 324/309 |
| 5,280,243 A | | 1/1994 | Miller | 324/303 |
| 5,428,291 A | | 6/1995 | Thomann et al. | 324/303 |
| 5,557,201 A | | 9/1996 | Kleinberg et al. | 324/303 |
| 6,242,912 B1 | | 6/2001 | Prammer et al. | 324/303 |
| 6,268,726 B1 | | 7/2001 | Prammer et al. | 324/303 |
| 6,326,619 B1 | | 3/2002 | Prammer et al. | 324/303 |
| 6,531,868 B2 | | 3/2003 | Prammer | 324/303 |
| 6,566,874 B1 | * | 5/2003 | Speier et al. | 324/303 |
| 6,600,316 B2 | * | 7/2003 | Chen et al. | 324/303 |
| 6,642,715 B2 | * | 11/2003 | Speier et al. | 324/303 |
| 6,717,404 B2 | * | 4/2004 | Prammer | 324/303 |

FOREIGN PATENT DOCUMENTS

WO          03/040743          5/2003          ............... 33/44

OTHER PUBLICATIONS

International Search Report dated Jun. 18, 2004.
Merboldt, K., et al., Flow NMR Imaging Using Stimulated Echoes, Journal of Magnetic Resonance, vol. 67, pp. 336–341 (1986).

* cited by examiner

Primary Examiner—Brij B. Shrivastav (57) ABSTRACT

A method for measuring in situ formation fluid flow utilizing an NMR logging while drilling tool is disposed in the borehole, a modified saturation recovery or time of flight angiography pulse sequence is utilized to tag spins in the formation, at least two measurements are made of the tagged spins as they propagate toward the borehole in the under-balanced environment, allowing a determination of fluid velocity, from which permeability may be determined. Techniques are disclosed to perform the method in both an over-balanced and under-balanced environment.

18 Claims, 4 Drawing Sheets

Proposed Modification of NMR Pulse Sequence to Measure In-flow dui

NMR FLOW MEASUREMENT WHILE DRILLING

FIELD OF THE INVENTION

The present invention relates to the utilization of nuclear magnetic resonance (NMR) logging while drilling (LWD). More particularly, to the measurement of the flow of fluids from a subterranean formation, as well as determining petrophysical properties of the formation during drilling operations using nuclear magnetic resonance.

BACKGROUND OF THE INVENTION

During drilling operations, a weighted fluid or mud is generally introduced into the borehole through the interior of the drill string and exits the drill string at the bit. This mud serves several purposes. It is used to cool the drill bit, which undergoes ambient and frictional heating during drilling operations. It is also used to flush drill cuttings back to the surface. One of the most important aspects of drilling mud is its use in formation pressure control. The hydrostatic head of the mud exerts pressure against the borehole wall, preventing formation fluids from entering the borehole during drilling operations. This type of drilling condition is generally referred to as overbalanced drilling. The fluid further contains particles that will build up on the borehole wall, forming a mudcake. The mudcake helps provide structural integrity to the borehole. It further reduces the loss of formation fluids into the borehole. However, the particles that make up the mudcake are transported by fluid at a pressure greater than the formation borehole pressure. As a result, filtrates of the weighted fluid create an invaded zone by contaminating or displacing the formation fluids. This invaded zone may adversely affect formation evaluation. Overbalanced drilling represents the most common drilling regime.

In certain types of formations, especially those with low porosity and permeability, overbalanced drilling can adversely affect the producibility of the formation. A different technique known as underbalanced drilling is used in such instances. In underbalanced drilling, the hydrostatic pressure exerted by the drilling fluid is less than the formation pressure. Under the right formation permeability and porosity conditions, formation hydrocarbons enter the wellbore and are transported to the surface with the drilling fluid, where they are separated out as production.

One of the key producibility parameters is permeability, or a measurement of the formation's ability to permit the transmission or passage of fluids. Permeability is currently measured a number of different ways. One method of doing so is to make sidewall corings of the formation and subject these to known laboratory tests to determine permeability. A more common means is through the use of formation test tools. These tools are placed in contact with the fluidic contact with the formation by means of a conduit. A piston, pump of other mechanism is used to reduce the local formation pressure through the conduit and the formation pressure is allowed to build back up, from which permeability can be estimated. However, the formation tests can result take a considerable amount of time. Moreover, the models used to derive formation permeability make certain assumptions that may prove inaccurate. Thus, there exists a need for a method and apparatus capable of making rapid determinations of permeability.

Characterizing the rate of flow and the type of hydrocarbons produced can be accomplished utilizing NMR logging. NMR logging utilizes techniques directed to aligning the magnetic moments hydrogen nuclei, present in both hydrocarbons and water, and modifying the alignment of spins, the nuclei giving off signals that may be detected. NMR tools, such as the NUMAR MRIL®-PRIME manufactured by Halliburton Company and the CMR™ manufactured by Schlumberger Ltd. are capable of providing formation information, including porosity, permeability, and volume fractions of various fluids in the formation and the types of fluids. However, these tools are both wireline tools that require a cessation of drilling operations, removal of the drill string and the subsequent lowering of the tool and commencement of logging operations. Recent advances in tool design have resulted in NMR tools which have been incorporated into drill strings to permit NMR logging while drilling. Structures for these types of NMR LWD tools have been disclosed in U.S. Pat. No. 5,280,243 to Miller and U.S. Pat. No. 5,557,201 to Kleinberg and U.S. Pat. No. 6,531,868 to Prammer. Halliburton, and Schlumberger now offer commercial NMR LWD services with their respective NMR LWD tools. Halliburton's MRIL-WD™ tool and Schlumberger's proVISION tool are directly capable of making hydrogen T1 measurements while drilling to determine total formation, free fluid and bound fluid porosity. When the drill string is stationary, the tool is capable of making T2 measurements to determine total, free-fluid and capillary bound water, clay-bound water porosity, derive permeability and type hydrocarbons in the formation.

SUMMARY OF THE INVENTION

The present invention is directed to a novel method for determining formation parameters and measuring flow rates of formation fluids either induced to flow from a formation during overbalanced drilling operations or being produced during underbalanced drilling operations utilizing a pulsed LWD NMR tool. More particularly, the present invention utilizes a modified saturation recovery sequence in which a selected saturation pulse creates a specific excited slice width in the formation, and a read out pulse to read signals from a specific slice of hydrocarbons flowing toward the borehole. Subsequent measurements are made by varying the excited slice width by modifying the shape, amplitude and time of the saturation pulse, while the read out slice remains constant. Due to the flow of hydrocarbons toward the borehole, the previously excited slice will migrate past the readout slice, attenuating the measured signal.

Alternatively, a modified sequence may be used in which a selected saturation pulse creates an excited slice in the formation, tagging flowing hydrogen nuclei therein. A baseline readout pulse slice is then created to establish a baseline position. The frequency of the readout pulse is then modified such that the readout slice is migrated in the direction of the borehole. By stepping the readout slice toward the borehole, one can determine how far the excited slice has migrated toward the borehole, thereby determining the hydrocarbon flow rate. Either technique may be used in conjunction with known NMR techniques to determine porosity and permeability, as well as fluid typing.

In the case of underbalanced drilling, the annular pressure is less than the formation pressure and fluids are naturally produced. Hence, the above techniques may be used to measure the fluid flow. In an overbalanced drilling environment, annular pressure exceeds formation pressure such that formation fluids would not normally flow toward the annulus. However, formation test techniques may be likewise used to induce formation fluid flow. While relatively new, formation testing while drilling is known in the industry. Tool systems, such as Halliburton's Sperry-Sun division GeoTap™ system extends a wireline-type pad and a piston to perform standard draw down, build up tests to induce fluid flow. The use of this type of tool incombination with the aforementioned NMR tools provide for a means to make NMR flow measurements in an over-balanced drilling environment. As noted above, formation fluid is produced into the annulus in an underbalanced drilling environment and NMR flow measurements may be made on the fluid as it flows within the formation toward the annulus.

BRIEF DESCRIPTION OF THE DRAWINGS

A better understanding of the method of the present invention may be had with reference to the following detailed description taken in conjunction with the following Figures, of which.

DETAILED DESCRIPTION OF THE PREFERRED EMBODIMENT

The present method is intended to utilize known existing LWD NMR tools, exemplary of such tools are those disclosed in U.S. Pat. Nos. 6,268,726 and 6,362,619 both assigned to NUMAR Corporation which are hereby incorporate by reference. It will be appreciated that any LWD NMR tool having a selectable radio frequency pulse capability may be used to carry out the method of the present invention. These techniques may be used in an underbalanced drilling environment where the formation pressure exceeds the pressure. Because the formation pressure is less that the hydrostatic pressure seen in the borehole, formation fluids are free to migrate to the borehole. Alternatively, they may be used in any environment wherein formation fluid flow may be induced toward the borehole, such as on a wireline formation test tool.

Figure 1A:
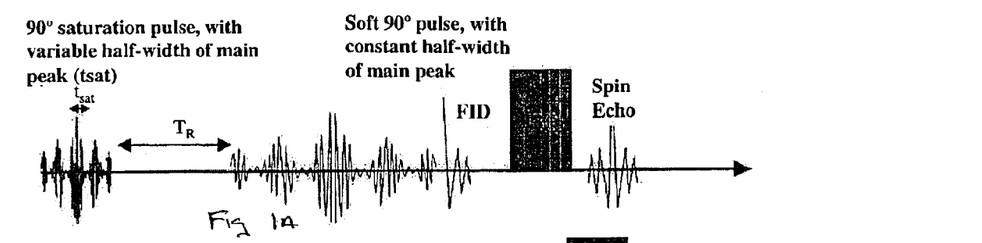
FIGS. 1A and 1B are depictions of one possible modified NMR pulse sequence.

In FIG. 1A, a specific pulse sequence is depicted for a tool of the type described above. A saturation pulse (amplitude modulation) is transmitted into the formation for a time period $T_{SAT}$. The saturation pulse may be one or more radio frequency pulses covering a wide range of frequencies. Alternatively, it may consist of one or more pulses that are swept over a wide range. The frequency and phase modulation pulses are depicted as stepping from a negative value to a positive value. It will be appreciated that stepping the amplitude over a range of values is but one possible means of encoding phase and frequency information. Accordingly, the saturation of amplitude, together with frequency and phase encoding is but one of numerous sequences that may be utilized within the scope of the present invention. For the magnetic field design of Halliburton's MRIL-WD™ tool, this saturation pulse sequence creates a cylindrical excitation slice within the formation.

A recovery period $T_R$ then ensues followed by a "soft" 90° pulse. This "soft" radio frequency pulse covers a narrower range of frequency than the initial saturation pulse. Given the constant magnetic field gradient of the logging tool, an annulus thinner than excited by the initial saturation pulse is scoped in the formation. A Free Induction Decay (FID) signal is generated by this second radio frequency pulse. Detecting the intensity of the FID reads out the spins at the readout slice in the formation. The location of the read-out slice is a function of the frequency of the readout pulse, and the magnetic field gradient of the tool.

The accuracy of detecting the FID intensity can be improved using a series of 180° pulses. Similar to a conventional CPMG sequence the 180° radio frequency pulses are separated from each other, and from the second "soft" 90° pulse by the inter-echo spacing time, $T_E$. Spin-echo signals are created between subsequent 180° pulses, and their amplitude is detected and recorded at time $T_e$ thereafter. The envelope of spin-echoes is frequently referred to as "CPMG decay". It can be evaluated using conventional NMR well logging techniques, yielding the maximum FID intensity and the spectrum of transverse relaxation times. Form the maximum FID signal intensity, information about formation porosity can be derived, whereas the spectrum of transverse relaxation times is commonly used for pore fluid identification, as well as for estimation of formation permeability.

Figure 1B:
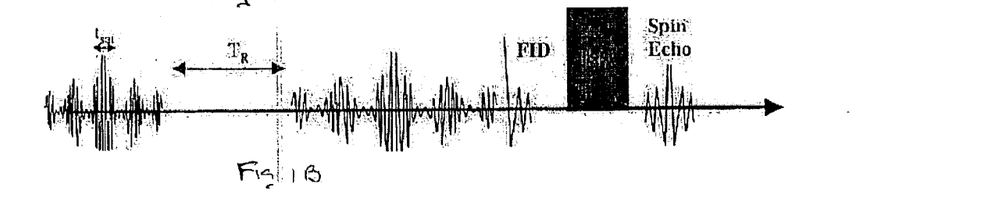

The sequence in FIG. 1B is similar to that of FIG. 1A. However, the saturation sequence is longer. For a given magnetic field gradient, the excitation slice width is an inverse function of the length of the saturation pulse. The shape of the pulse as a function of time and its frequency content are inter-related by their Fourier transform. The narrower, i.e., shorter the saturation pulse is with respect to time, the greater number of frequencies its Fourier transform will contain and the wider the excitation slice. Thus, the longer that the saturation pulse is turned on, the fewer number of frequencies are applied and the slice is effectively "narrower." The objective is to rotate the total magnetization of hydrogen nuclei by 90°. The flip angle is determined by the integral of the saturation pulse, i.e., the time it is applied times its effective amplitude. In order to assure that the rotation of the total magnetization is at 90°, the amplitude of the longer saturation pulse is decreased to maintain a constant intensity. The saturation pulse is again followed by a $T_R$ recovery period, a soft 90° pulse, after which one reads out the FID signal. Additionally, as described above, a read-out sequence comprised of a series of 180° pulses, can be added to detect the spin-echo decay.

Because the frequency band of the saturation pulse is narrower in FIG. 1B, the thickness of the slice excited with the saturation pulse decreases. Due to the under-balanced drilling environment, this slice is effectively propagating toward the borehole, together with the formation fluid. Alternatively, the fluid flow may be induced in an over-balanced environment through the use of LWD formation test tools as set forth above. However, the read-out pulse remains constant and with it the position and width of the read-out slice in the formation. It will be appreciated that this series of pulse sequences is sensitive to the flow of formation fluid: with both the saturation and the read-out pulse centered around the same frequency (i.e., location in the well bore), a full intensity of the FID, or CPMG, signal will only be detected if the slice excited by the saturation pulse has not migrated beyond the slice detected by the read-out pulse during $T_R$. This will be the case for stagnant formation fluid, or for a sufficiently small product of flow velocity, v, and $T_R$. Depending on the thickness of the slice excited with the saturation pulse, the time $T_R$, and the velocity of flowing formation fluids, there will be a threshold from which non-polarized spins related to formation fluids that have not been excited by the saturation pulse are entering the read-out slice. These non-polarized spins do not contribute towards the NMR signal. As a result, the measured FID, or CPMG, signals will be attenuated. The thickness of the excited slice, and $T_R$, are parameters which can be used to adjust the measurement for various flow conditions. In order to detect increasing flow velocities, shorter $T_R$'s, and larger differences between the thicknesses of excitation, and read-out annuli would be required.

Thus, one method of describing the above sequence may be expressed as $$[tsat_i \rightarrow \pi/2 \rightarrow FID \rightarrow T_E \rightarrow [\pi \rightarrow T_E]/]^i \quad [1]$$

where $tsat_i = \int_0^{t1} I_1(t)dt = \int_0^{t2} I_2(t)dt = \int_0^{t3} I_3(t)dt \ldots = \int_0^{ti} I_i(t)dt$ and $t_1 < t_2 < t_3 \ldots < t_i$, where $I_1, I_2, \ldots I_i$ is the variable intensity of the saturation pulse.

Figure 2A:
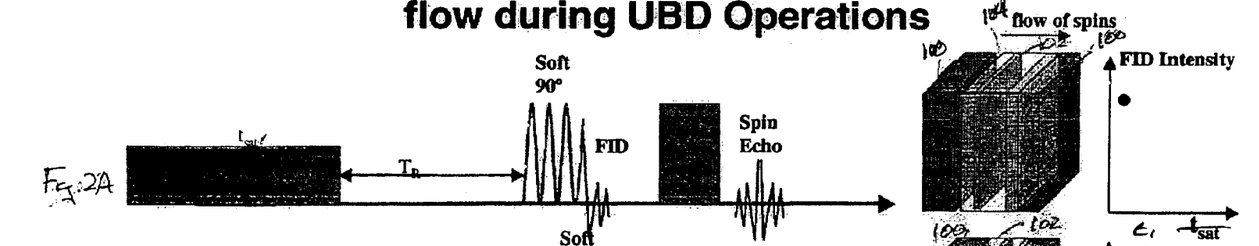
FIGS. 2A–2D are simplified depictions of the sequence of FIGS. 1A and 1B depicting the sequence, slice selection in the formation and signal amplitude.

FIGS. 2A–2D is an attempt to depict a simplified pulse sequence, the relative movement of the excited slice relative to the readout slice and the measured signal intensity. In FIG. 2A the 90° saturation pulses are represented as modulated sinc-functions, characterized by a half-width length of the main peak, $t_{sat_i}$, followed by a recovery time $T_R$. As noted above, $T_R$ is selectable parameter that may be set based on existing permeability information or it may be set by a surface control system transmitting commands to the LWD(NMR tool by means of mud pulse or other telemetry systems. Following the period $T_R$ a soft 90° pulse is transmitted. In response to the soft 90° pulse, the hydrogen nuclei generate a Free Induction Decay (FID) signal that may be measured. As noted above, it is read in conjunction with a readout pulse.

The result is depicted as showing a broad excited "shell" of hydrogen spins 102 in the formation 100 that is excited by the saturation pulse. A thinner readout slice 104 is positioned within the excited shell, resulting in the detection of a signal. A representative graph point is shown measuring FID signal intensity compared to time the tsat pulse is applied. It will be appreciated that the FID intensity shown in FIGS. 2A–2D, could be replaced by graphs representing the successive 180° pulse, CPMG portion of the sequence. Moreover, the signal intensity measured would be an analog signal over a range of time. For the purposes of illustration, only, the signal response is represented as a dot.

Figure 2B:
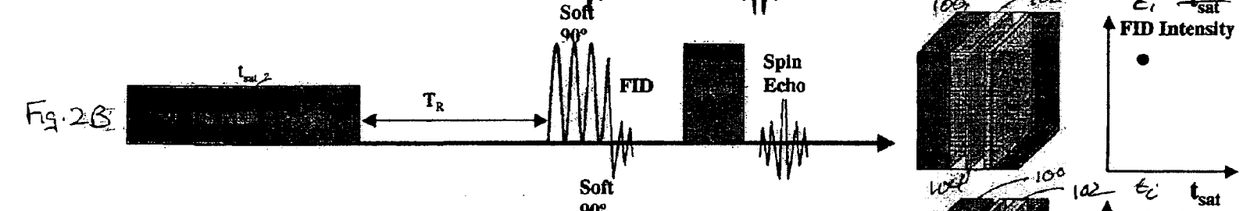

In FIG. 2B, the saturation pulse is shown to have a longer time constant in duration but less integrated intensity, so as to satisfy the $tsat_i = \int_0^{t1} I_1(t)dt = \int_0^{t2} I_2(t)dt = \int_0^{t3} I_3(t)dt = \int_0^{ti} I_i(t)$ dt requirements of Eq. 1. The $T_R$ recovery period remains constant and a soft 90° pulse is again transmitted followed by the repeated 180°—readout pulse sequence. As shown in the accompanying slice illustration, because of the flow of formation fluid, the excited shell 102 has migrated in the direction of flow, i.e., towards the borehole. The frequency of the readout pulse remains the same, meaning that the readout slice 104 remains in the same position relative to the borehole. The signal representation for FIG. 2B shows the FID intensity relatively constant, despite of the thinner excited slice related to the longer time period of the saturation pulse. That is because the readout slice 104 is still within the excited shell 102.

Figures 2C, 2D:
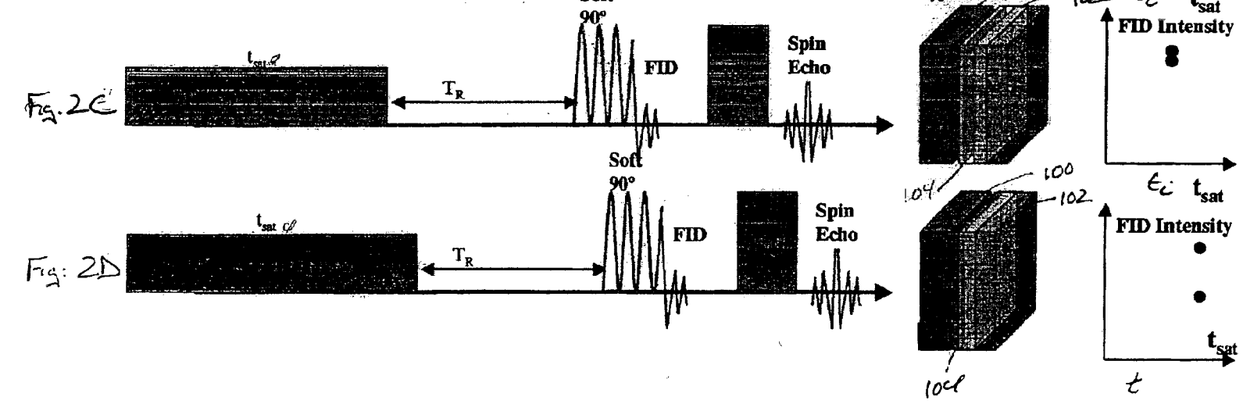

In FIG. 2C, the saturation pulse is yet longer in duration, and is followed once again by the soft 90° pulse and the repeated 180°—readout pulse sequence. In the slice illustration, the excited shell 102 has become even narrower. It center position has migrated toward the borehole exactly for the same distance as it was the case illustrated in FIG. 2B. This distance is determined only by the velocity of flowing formation fluid, and the duration of the repetion time, $T_R$. The readout slice 104 again remains in the same relative position. However, the FID signal intensity, as shown in the plot, decreases because the narrower excited slice has now propagated partly beyond the read-out slice. In that case, the read-out slice will be populated by non-polarized spins which do not contribute to the FID signal intensity.

The same procedure is followed in FIG. 2D, with a yet longer in duration saturation pulse. Again, the now narrowest shell of excited spins has migrated toward the borehole, leaving only non-polarized spins in the read-out slice. Therefore, no specific NMR signal can be detected, and the measured FID intensity is reduced to statistical noise level.

The drop in signal intensity as shown in FIGS. 2C and 2D is attributable to the movement of excited spins. From this, one can determine the velocity of the flow of hydrogen protons (and hydrocarbons). In this instance, the imaging resolution is limited by the ratio of the thicknesses of saturation- and read-out slices.

Detecting not only the FID signal amplitude but the entire spin-echo decay offers the advantage that a normal spin density image can be obtained by utilizing the spin echo that arises as a result of the repeated square 180° pulses. The specific timing techniques are well known and are set forth in Merboldt, K., et al. *Journal of Magnetic Resonance*, Vol. 67, p. 336 (1986). Furthermore, this addition enables the utilization of traditional NMR well logging techniques that arc based on the evaluation of the spectrum of transverse relaxation times of the measured pore fluids.

An alternative method for determining fluid flow information would be to vary the frequency of the readout pulse, instead of varying the length and intensity of the saturation pulse. A saturation pulse similar to that in the above sequence is transmitted followed by a waiting period $T_R$, followed by a 90° read-out pulse, and the series of 180° readout pulses. That pulse sequence would be repeated, with varying frequencies of the read-out pulse such that the readout slice effectively moves in the direction of the borehole. As spins migrate toward the borehole, the successive read-out pulses will eventually detect the slice of excited spins entering the readout slice, from which velocity can be determined.

It will be appreciated that stepping the frequency of the read-out pulse over a range of values, or a variation of the length of the saturation pulse, is but one possible means of detecting the propagating slice of excited spins. Alternative methods, utilizing, for instance, the variation of the repetition time, will also result in an modification of the detected NMR signal intensity, from which information about the velocity of formation fluid flow can be derived.

Figure 3A:
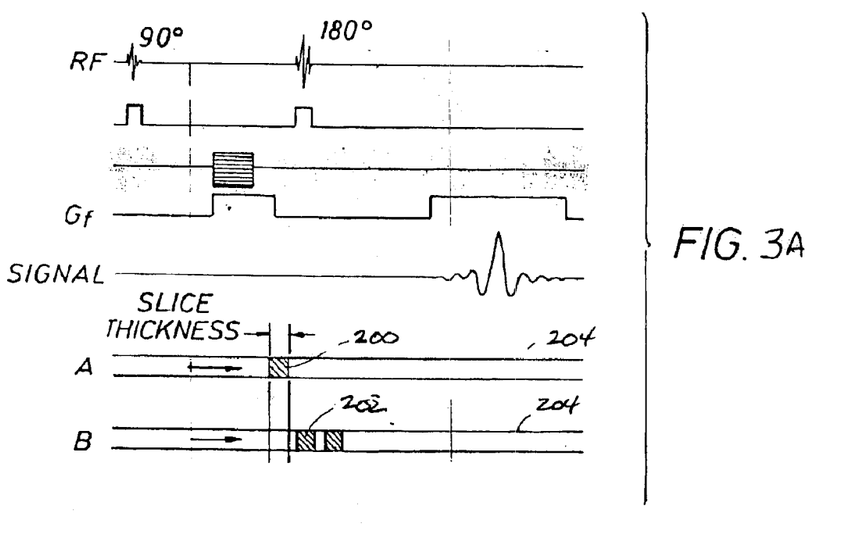
FIGS. 3A and 3B depict time of flight angiography techniques that may be used to determined fluid velocity.
Figure 3B:
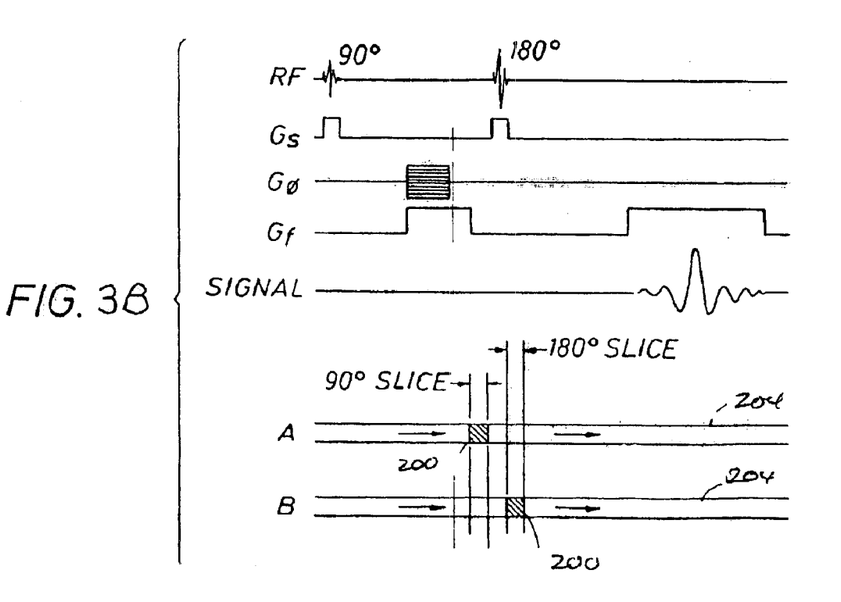

Other techniques may be used to infer the velocity of fluid flow. Time of flight (TOF) angiography is also referred to as "spin tagging" and is the most common form of angiography utilized within the medical field. There is no single technique for carrying out TOF angiography. One technique utilizes a spin echo sequence where a 90° slice selective pulse is applied followed by a 180° slice selective pulse having a differing frequency. The net effect would be to have two differing slices. Referring to FIG. 3A, the activation of the various pulse sequences are depicted along a common "time line" with the movement of fluid through a formation. In FIG. 3A, a 90° slice selection RF pulse and a slice selection gradient $G_s$ are applied. The phase encoding gradient $G_\phi$ and the frequency (or read) gradient $G_f$ are applied after the 90° RF pulse and the slice selection gradient. The slice selection gradient and pulse excites the spins within the target slice 200 within the flow path 204, in time line A. As the energized spin packet flows along flow path 204, the phase and frequency gradients are applied. When the 180° RF pulse is applied, it is applied to a packet 202 that was not subject to the initial gradients and 90° RF pulse. While the FID signal may be detected, no echo signal will be detected. In order to overcome this, the frequency of the 90° RF pulse differs from that of the 180° RF pulse. The effect is to make two different slice selections, with the 180° RF pulse slice selection following the 90° slice in the direction of the flow. As seen in FIG. 3B, the 90° RF pulse is applied, together with the slice selection gradient $G_s$. The spin packet 200 within the 90° slice thickness is moved to the transverse plane. This is followed by the application of the phase encoding and read gradients. When a 180° RF pulse of a differing selected frequency is applied, the spin packet 200 which has begun to dephase is within 180° slice (line B), the spin packet continues in the direction of flow and the frequency $G_f$ or read gradient is applied and the echo signal is detected. This sequence can then be repeated to detect subsequent spin echoes as the The sequence of FIG. 3B could be annotated as $$\pi/2_{f1} \bullet G_S \rightarrow G_\phi \bullet G_F \rightarrow [\pi_{f2} \bullet G_S \rightarrow G_F \bullet T_E]^i \quad [2]$$

where $G_S$, $G_\phi$, and $G_F$, represent application of the slice selection, phase encoding and frequency or read encoding gradients, f1 and f2 represent the differing frequencies for the RF pulses, $T_E$ is the recording of the spin echo signal and the operator $\phi$ represents simultaneous application of the specified gradients, pulses or recordings.

It will be appreciated that if the spin packets energized by the 90° RF pulse are not subjected to the 180° pulse, that no echo signal will be detected. Likewise, unless the packet 200 subjected to the 180° RF pulse has been moved into the transverse plane by the 90° pulse, no echo signal will be detected. Further, if there is no flow, the 90° RF excited spin packets will not move into the slice thickness for the 180° pulse.

Another technique permits the use of a single frequency/same slice selection is the use of successive interrogations of the selected slice in multiple pulse train utilizing a stimulated echo imaging sequence variant. As set forth in FIG. 4, a 90° RF sinc pulse is applied in conjunction with a $G_s$ slice selection gradient. This is followed by the application of a $G_\phi$ phase encoding gradient, together with a frequency/read gradient $G_f$. Following application of the read gradient, a square 90° RF wave pulse is applied. A sequence consisting of a 90° RF sinc pulse, applied in conjunction with a $G_s$ selection gradient is applied, followed by a $G_f$ read gradient during which time the signal is acquired. By repeating the final sequence, the motion of the target slice is successively followed in a single phase encoding experiment. The entire sequence is then repeated with a differing phase encoding gradient $G_\phi$. The signal intensity is then plotted against time, from which the velocity is determined, given the tagging and slice selection separation. In this instance, the imaging resolution is limited by the slice thickness. The stimulated echo method further offers the advantage that a normal spin density image can be obtained by utilizing the spin echo (not shown) that arises between the second 90° RF spike pulse and the third 90° sinc pulse.

Figure 4:
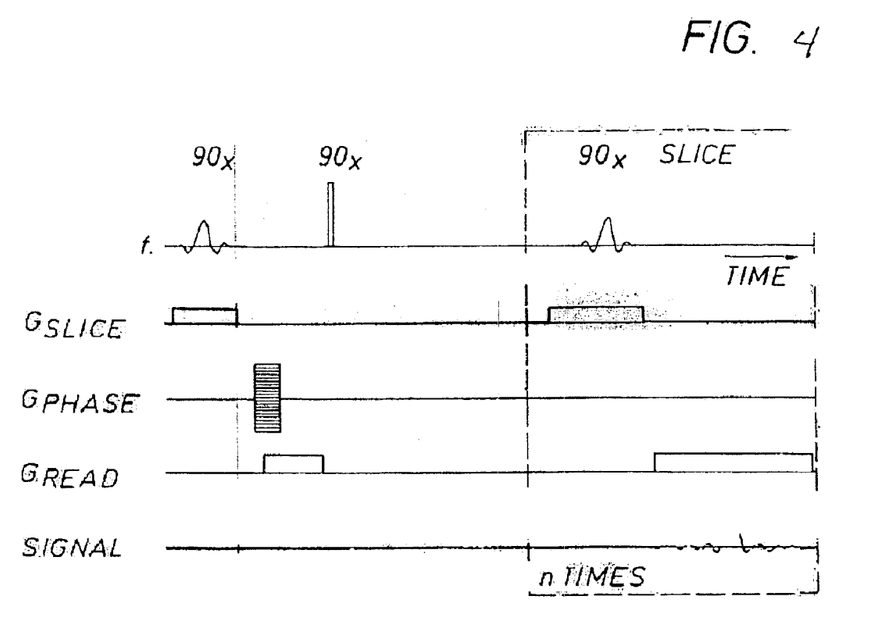
FIG. 4 is a depiction of a sequence that may be used to measure fluid flow.

This sequence of FIG. 4 could be annotated as follows:

$$\pi/2_{Sinc} \bullet G_S \rightarrow G_\phi \bullet G_F \rightarrow \pi/2_{Sq}[\pi/2_{Sinc} \bullet G_S \rightarrow G_F \bullet T_e]^i \quad [3]$$

following the conventions of Eq. 2, where Sinc and Sq refer to the sinc and square wave nature of their respective $\pi/2$ RF pulses.

The specific timing techniques are well known and are set forth in Merboldt, K., et al. *Journal of Magnetic Resonance*, Vol. 67, p. 336 (1986). What is clear is that the above techniques are limited in terms of the velocity ranges. TOF techniques may be utilized to measure flow velocities in response to formation test tool fluid withdrawal. Moreover, the existence of known spin echo imaging techniques, e.g., phase alternated CPMG sequences may be used to determine the fluid characteristics.

CONCLUSION

The present invention discloses a means for directly determining formation fluid flow velocities in either an overbalanced or an underbalanced drilling environment. Existing LWD NMR tools may be utilized with the specific sequences modified and other known time of flight techniques deployed to determine the rate of flow of spins in the formation toward the borehole. Based on a determination of the velocity of the spins, and the additional knowledge of the viscosity of the formation fluids, and the pressure difference between formation and well bore, an in-situ formation permeability determination may be made.

While the present invention has been described in terms of various embodiments, modifications in the apparatus and techniques described herein without departing from the concept of the present invention. It should be understood that the embodiments and techniques described in the foregoing are illustrative and are not intended to operate as a limitation on the scope of the invention.

We claim:

1. A method for determining subterranean formation flow characteristics, the steps comprising:
   (a) providing a borehole through said subterranean formation;
   (b) positioning a nuclear magnetic resonance (NMR) tool and inducing fluid flow from said formation toward said borehole;
   (c) generating a first radio frequency saturation pulse of time $t_1$ and intensity $I_1$ with said NMR tool to align nuclei in formation fluid flowing toward said borehole;
   (d) generating a first 90° radio frequency NMR tool following a predetermined time period;
   (e) recording a first free induction decay (FID) signal generated by said formation fluid nuclei;
   (f) generating a second radio frequency saturation pulse of time $t_2$ and intensity $I_2$, with said NMR tool after a predetermined period of time, wherein:

$$\int_0^{t1} I_1(dt) = \int_0^{t2} I_2(dt)$$

(g) generating a second 90° radio frequency pulse following a predetermined time period;
   (h) recording a second FID signal generated by said formation fluid nuclei; and
   (i) deriving formation fluid flow rate from the differences in said recorded first and second FID signals.

2. The method of claim 1, performed in underbalanced conditions and said formation fluid naturally flows toward said borehole.

3. The method of claim 1, wherein said NMR tool further includes a formation test tool and said formation test tool is engaged to be in fluid communications with said subterranean formation to create fluid flow from the subterranean formation to said formation test tool.

4. The method of claim 1 further comprising generating successive saturation pulse and 90° pulse sets and making FID measurements following each set and repeating step (i), where $\int_0^{t_1} I_1(dt) = \int_0^{t_2} I_2(dt) = \int_0^{t_3} I_3(dt) = \int_0^{t_i} I_i(dt)$.

5. The method of claim 1, further including the steps of generating at least one 180° radio frequency pulse a predetermined time following the measurement of each FID signal and measuring a spin echo following each 180° radio frequency pulse.

6. A method for determining subterranean formation fluid flow velocity while drilling, the steps comprising:
(a) providing a borehole is the subterranean formation utilizing a drilling string, said drilling string having a bottom hole assembly (BHA) comprised of at least:
   a drill bit; and
   a nuclear magnetic resonance (NMR) tool;
(b) positioning said BHA opposite a selected zone of interest and inducing formation fluid flow from said formation toward said borehole;
(c) generating a series of radio frequency pulses with said NMR tool according to the sequence:

$$[tsat_i \to T_R \to \pi/2 \to FID]_i^i,$$

where $tsat_i$ is a saturation pulse and $$tsat_i = \int_0^{t_1} I_1(t)dt = \int_0^{t_2} I_2(t)dt = \int_0^{t_3} I_3(t)dt \ldots = \int_0^{t_i} I_i(t)dt \text{ and}$$

$t_1 < t_2 < t_3 \ldots < t_i$, and where $I_1, I_2, \ldots I_i$ is the variable intensity of the saturation pulse;
(d) recording the free induction decay (FID) signal generated by formation fluid nuclei; and
(e) comparing the recorded FID signals to determine flow velocity.

7. The method of claim 6, wherein said drilling operations are performed in underbalanced conditions and said formation fluid naturally flows toward said borehole.

8. The method of claim 6, wherein said bottom hole assembly further includes a formation test tool and said formation test tool is engaged to be in fluid communications with said subterranean formation during a pause in drilling operations, to create fluid flow from the subterranean formation to said formation test tool.

9. The method of claim 6, further including the step of generating at least 180° pulse at a predetermined time following recording of the FID and measuring at least one spin echo signal from said formation fluid nuclei.

10. A method for characterizing fluid flow in a subterranean formation during drilling operations:
(a) providing a borehole in the subterranean formation utilizing a drilling string, said drilling string having a bottom hole assembly (BHA) comprised of at least:
   a drill bit; and
   a nuclear magnetic resonance (NMR) tool;
(b) positioning said BHA opposite a selected zone of interest and inducing formation fluid flow toward said borehole;
(c) generating a series of radio frequency pulse sequences according to:

$$[tsat_i \to T_R \to \pi/2 \to FID \to T_E \to [\pi \to T_e]_j]_i^i \quad [1]$$

where $tsat_i$ is a saturation pulse, $$tsat_i = \int_0^{t_1} I_1(t)dt = \int_0^{t_2} I_2(t)dt = \int_0^{t_3} I_3(t)dt \ldots = \int_0^{t_i} I_i(t)dt \text{ and}$$

$t_1 < t_2 < t_3 \ldots < t_i$,

FID is a free induction decay signal created by said formation fluid nuclei;
(d) recording a FID signal and at least one spin echo signal following said at least one 180° radio frequency pulse for each sequence in the series of step (c); and
(e) comparing said FID and spin echo signals for successive sequences to determine formation fluid flow velocity.

11. The method of claim 10, wherein the step of inducing formation fluid to flow toward said borehole includes drilling operations performed in an underbalanced environment.

12. The method of claim 10, wherein said bottom hole assembly further includes a formation test tool and said formation test tool is engaged to be in fluid communications with said subterranean formation during a pause in drilling operations, to create fluid flow from the subterranean formation to said formation test tool.

13. A method for characterizing fluid flow in a subterranean formation during drilling operations, the steps comprising:
(a) providing a borehole in the subterranean formation utilizing a drilling string, said drilling string having a bottom hole assembly (BHA) comprised of at least:
   a drill bit; and
   a nuclear magnetic resonance (NMR) tool;
(b) positioning said BHA opposite a zone of interest and inducing a flow of fluid from said subterranean formation toward said borehole;
(c) generating a series of radio frequency pulses and pulsed magnetic gradients and recording spin echo signals produced by nuclei in said flowing formation fluid according to the sequence:

$$\pi/2_{f1} \bullet G_S \to G_\phi \bullet G_F \to [\pi_{f2} \bullet G_S \to G_F \bullet T_E]_i^i; \text{ and}$$

(d) determining the fluid flow velocity as a result of the spin echo signals received.

14. The method of claim 13, wherein said bottom hole assembly further includes a formation test tool and said formation test tool is engaged to be in fluid communications with said subterranean formation during a pause in drilling operations, to create fluid flow from the subterranean formation to said formation test tool.

15. The method of claim 13, wherein wherein the step of inducing formation fluid to flow toward said borehole includes drilling operations performed in an underbalanced environment.

16. A method for characterizing fluid flow in a subterranean formation during drilling operations, the steps comprising:
(a) providing a borehole in the subterranean formation utilizing a drilling string, said drilling string having a bottom hole assembly (BHA) comprised of at least:
   a drill bit; and
   a nuclear magnetic resonance (NMR) tool;
(b) positioning said BHA opposite a zone of interest and inducing a flow of fluid from said subterranean formation toward said borehole;
(c) generating a series of radio frequency pulses and pulsed magnetic gradients and recording spin echo signals produced by nuclei in said flowing formation fluid according to the sequence:

$$\pi/2_{Sinc} \bullet G_S \to G_\phi \bullet G_F \to \pi/2_{Sq} [\pi/2_{Sinc} \bullet G_S \to G_F \bullet T_E]_i^i; \text{ and}$$

(d) determining the fluid flow velocity as a result of the spin echo signals received.

17. The method of claim 16, wherein said bottom hole assembly further includes a formation test tool and said formation test tool is engaged to be in fluid communications with said subterranean formation during a pause in drilling operations, to create fluid flow from the subterranean formation to said formation test tool.

18. The method of claim 16, wherein wherein the step of inducing formation fluid to flow toward said borehole includes drilling operations performed in an underbalanced environment.

* * * * *